UNITED STATES PATENT OFFICE 2,650,236

PREPARATION OF FURANS

Francis E. Condon, Borger, Tex., and Edward E. Burgoyne, Bartlesville, Okla., assignors to Phillips Petroleum Company, a corporation of Delaware No Drawing. Application April 17, 1951, Serial No. 221,528

16 Claims. (Cl. 260—346.1)

This invention relates to the preparation of furans. In one aspect, it relates to the preparation of a furan from an acetylenic diol. In another aspect, it relates to the preparation of a furan by the dehydration of an acetylenic diol. In still another aspect it relates to the preparation of a furan from an acetylenic diol by the use of a catalyst consisting essentially of cobalt molybdate supported on porous alumina. In another aspect, it relates to the preparation of furan by contacting 2-butyne-1,4-diol with cobalt molybdate on alumina at an elevated temperature.

The terms "a furan" and "furans," as used in this specification are intended to include furan itself and alkyl-substituted derivatives thereof. The term "alkyl" is used to denote hydrocarbon radicals having the formula $-C_nH_{2n+1}$.

According to this invention, an acetylenic diol is contacted with a cobalt molybdate-alumina catalyst, under specific reaction conditions of temperature, pressure, and flow rate or space velocity, to obtain a furan.

The acetylenic diols used in accordance with this invention have from four to ten carbon atoms per molecule. They are 2-butyne-1,4-diol and alkyl substituents thereof. The two hydroxyl groups are three carbon atoms remote from each other, and the triple bond is intermediate the two hydroxyl-substituted carbon atoms. The acetylenic diols reacted in accordance with this invention can be represented by the formula

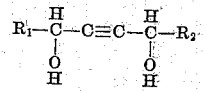

in which $R_1$ and $R_2$ are radicals selected from the group consisting of hydrogen and alkyl. Specific examples of these diols and the products obtained by reacting them in accordance with this invention are shown in the following tabulation:

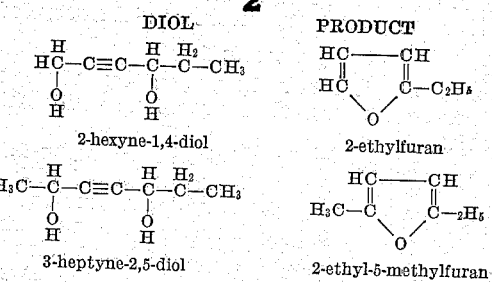

The acetylenic diols used in the process of this invention are prepared by condensing acetylene with the appropriate aldehyde, as known in the art. Thus, one skilled in the art will readily be able to obtain the starting materials of the present invention.

The catalysts suitable for use in the process of the invention are prepared by impregnating a porous alumina support with cobalt molybdate by any suitable process. For example, the alumina can be agitated in an aqueous dispersion of cobalt molybdate, the excess liquid decanted, and the remaining impregnated alumina recovered and dried. Alternatively, the alumina and the cobalt molybdate can be ground and mechanically mixed and pelleted. In another method, the alumina is impregnated with molybdenum oxide, agitated with a dilute aqueous solution of a cobalt salt such as the nitrate, removed, and dried. Other methods known in the catalyst preparation art can also be used. "Porous alumina" as used in this specification means adsorptive alumina as prepared according to prior art methods. Commercial "activated alumina" is one example. Bauxite dehydrated by heating it at a temperature from about 700° to about 1200° F. is another. The important feature is that the alumina is at least partially dehydrated, but not heated to such a high temperature that it is converted to a catalytically inactive form. Such porous alumina and methods of preparing it are well known in the art. The cobalt molybdate content of the finished catalyst is from 0.2 to 40 weight per cent, preferably from about 1 to about 30 per cent. It is within the scope of the invention that the ratio of CoO to $MoO_3$ in the catalyst be higher or lower than the theoretical required by the formula $CoMoO_4$. The percentages set forth hereinabove relate broadly to the sum of the CoO and the $MoO_3$ content of the catalyst as determined by conventional inorganic analysis. Substantial proportions of both cobalt and molybdenum, i. e., more than mere traces, must, however, be present in the combined state in the catalyst.

The reaction temperature of this invention is in the range 250° to 500° C., preferably 325° to 425° C.

The pressure is from 1 to 50 p. s. i. a., preferably 10 to 20 p. s. i. a. Atmospheric pressure is satisfactory. The effect of low and moderate pressure may be obtained by diluting the diol with a gas, such as steam, nitrogen, or methane, that is chemically inert toward the diol under the reaction conditions. Steam has the advantage of counteracting carbon formation on the catalyst. The volume ratio of steam or other diluent to diol is from 0.5:1 to 10:1, preferably 1:1 to 5:1.

The reaction is conducted at a space velocity from 0.1 to 5 liquid volumes of diol per volume of catalyst per hour, preferably 0.1 to 2 volumes per volume per hour.

The effluent from the contacting is cooled and subjected to fractionation and separation processes known in the art. The furan product is thus recovered, and any unreacted diol is recycled.

Example 1

This example shows the preparation of furan from 2-butyne-1,4-diol in accordance with this invention.

A 35 per cent aqueous solution of 2-butyne-1,4-diol was heated to 400° C. and contacted with a catalyst consisting of 20 weight per cent cobalt molybdate on 80 per cent porous alumina. The pressure was atmospheric, and the space velocity was 0.15 liquid volume of diol per volume of catalyst per hour. The effluent was passed through a water-cooled condenser, an ice trap, and a Dry-Ice trap in series. A 15 per cent theoretical yield of a volatile liquid was collected in the Dry-Ice trap. This liquid was relatively volatile and had a refractive index of 1.4123 at 20° C. and was crude furan. The boiling point of pure furan is 32° C. and the refractive index at 20° C. is 1.4216. The liquid was positively identified as furan by reacting it with maleic anhydride in ether solution to obtain 3,6-endoxo-delta-4-tetrahydrophthalic anhydride, which had a melting point (with decomposition) of 116° C. The melting point recorded in the literature is 118° C.

Example 2

A catalyst consisting of 0.94 weight per cent CoO and 0.20 per cent MoO₃ supported on alumina gave results substantially the same as those in Example 1 under the same conditions.

The weight ratio of CoO to MoO₃ in this catalyst was 4.7:1. The ratio in CoMoO₄ is 0.52:1. Thus, it is seen that considerable variation from the theoretical ratio may be tolerated within the scope of the invention.

Reasonable variation and modification are possible within the scope of the foregoing disclosure and the claims to the invention, the essence of which is that an acetylenic diol having the formula

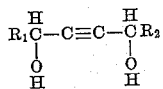

in which R₁ and R₂ are radicals selected from the group consisting of hydrogen and alkyl, is converted to a furan by contacting, at a temperature in the range 250° to 500° C., with a catalyst consisting essentially of cobalt molybdate on alumina.

We claim:

1. A process for preparing a furan which process comprises contacting, at a temperature in the range 250° to 500° C., an acetylenic diol containing from 4 to 10 carbon atoms per molecule with a catalyst consisting essentially of cobalt molybdate supported on porous alumina, the two hydroxyl groups of said diol being three carbon atoms remote from each other and the triple bond being intermediate the two hydroxyl-substituted carbons, and recovering said furan as the chief product of the process.

2. A process for preparing a furan which process comprises contacting, at a temperature in the range 250° to 500° C., a space velocity in the range 0.1 to 5 liquid volumes of diol per volume of catalyst per hour, and a pressure in the range 1 to 50 p. s. i. a., an acetylenic diol having from 4 to 10 carbon atoms per molecule with a catalyst consisting essentially of cobalt molybdate supported on porous alumina, said diol having the formula

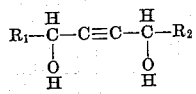

in which R₁ and R₂ are radicals selected from the group consisting of alkyl and hydrogen, and recovering a furan as the chief product of the process.

3. The process of claim 2 in which the diol is 2-butyne-1,4-diol.

4. The process of claim 2 in which the temperature range is 325° to 425° C., the space velocity range is 0.1 to 2, and the pressure range is 10 to 20 p. s. i. a.

5. The process of claim 2 in which the furan is 2-methylfuran and the diol is 2-pentyne-1,4-diol.

6. The process of claim 2 in which the furan is 2,5-dimethylfuran and the diol is 3-hexyne-2,5-diol.

7. The process of claim 2 in which the furan is 2-ethylfuran and the diol is 2-hexyne-1,4-diol.

8. The process of claim 2 in which the furan is 2-ethyl-5-methylfuran and the diol is 3-heptyne-2,5-diol.

9. The process of claim 2 in which the cobalt molybdate content of the catalyst is from 0.2 to 40 weight per cent.

10. A process for the preparation of furan which process comprises contacting a 35 volume per cent aqueous solution of 2-butyne-1,4-diol with a catalyst consisting essentially of 20 parts by weight of cobalt molybdate supported on 80 parts by weight of porous alumina at 400° C., atmospheric pressure, and a space velocity of 0.15 liquid volume of diol per volume of catalyst per hour, cooling the effluent to condense furan, and recovering condensed furan as a product of the process.

11. The process of claim 10 in which the catalyst has the composition 0.94 per cent CoO, 0.20 per cent MoO₃, and the remainder porous alumina.

12. A process for converting an acetylenic diol to a furan which process comprises contacting said diol, together with steam, with a catalyst consisting essentially of cobalt molybdate supported on porous alumina, said contacting being conducted at a temperature in the range of 250° to 500° C., a pressure in the range of 1 to 50 p. s. i. a., and a space velocity in the range of 0.1 to 5 volumes of diol per volume of catalyst per hour, said diol having from four to ten carbon atoms per molecule and having the formula

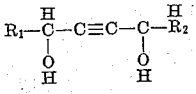

in which R₁ and R₂ are radicals selected from the group consisting of alkyl and hydrogen, and recovering a furan as the chief product of the process.

13. The process of claim 12 in which the volume ratio of steam to diol is in the range of 0.5:1 to 10:1.

14. A process for preparing a furan from an acetylenic diol having from 4 to 10 carbon atoms per molecule and selected from the group consisting of 2-butyne-1,4-diol and alkyl substituents thereof, which process comprises contacting said diol, at a temperature from 325° to 425° C., a pressure from 10 to 20 p. s. i. a., and a space velocity from 0.1 to 2 liquid volumes of diol per volume of catalyst per hour, with a catalyst consisting essentially of from 1 to 30 weight per cent of cobalt molybdate supported on 99 to 70 weight per cent of porous alumina, and recovering a furan as a product of the process.

15. The process of claim 14 in which the diol is diluted with from 1 to 5 volumes of an inert gaseous diluent.

16. The process of claim 15 in which the diluent is steam.

FRANCIS E. CONDON.
EDWARD E. BURGOYNE.

References Cited in the file of this patent

FOREIGN PATENTS

| Number | Country | Date |
|---|---|---|
| 510,615 | Great Britain | Aug. 4, 1939 |
| 510,949 | Great Britain | Aug. 8, 1939 |
| 611,072 | Great Britain | Oct. 25, 1948 |

OTHER REFERENCES

Dupont, Ann. Chim. Phys. 1913, 30, page 512.
Marvel, J. Am. Chem. Soc. 1933, 55, pp. 1655–1662.